United States Patent

Michael et al.

[15] 3,697,780

[45] Oct. 10, 1972

[54] LIMIT CONTROL

[72] Inventors: Richard W. Michael; Hi W. Staten, Jr., both of Bartlesville, Okla.

[73] Assignee: Phillips Petroleum Company

[22] Filed: April 12, 1971

[21] Appl. No.: 133,030

[52] U.S. Cl. ..................307/235, 307/237, 328/115, 328/150, 330/110

[51] Int. Cl. ..............................................H03k 5/20

[58] Field of Search ......307/235, 237; 328/150, 146, 328/115; 330/110; 324/123, 133

[56] References Cited

UNITED STATES PATENTS

| | | | |
|---|---|---|---|
| 3,577,139 | 5/1971 | Foerster | 330/110 |
| 3,538,445 | 11/1970 | Brennen | 307/235 |
| 3,487,233 | 12/1969 | Reap | 307/235 |
| 3,317,747 | 5/1967 | Bryant | 307/235 |
| 3,328,705 | 6/1967 | Eubanks | 307/235 A |

*Primary Examiner*—Rudolph V. Rolinec
*Assistant Examiner*—David M. Carter
*Attorney*—Young and Quigg

[57] ABSTRACT

A circuit is disclosed which provides an output signal which is representative of an input signal as long as the input signal is above a lower limit and below an upper limit. The output signal does not fall below the lower limit nor rise above the upper limit. This circuit includes a pair of operational amplifiers and sources of reference potentials representative of the respective limits.

8 Claims, 1 Drawing Figure

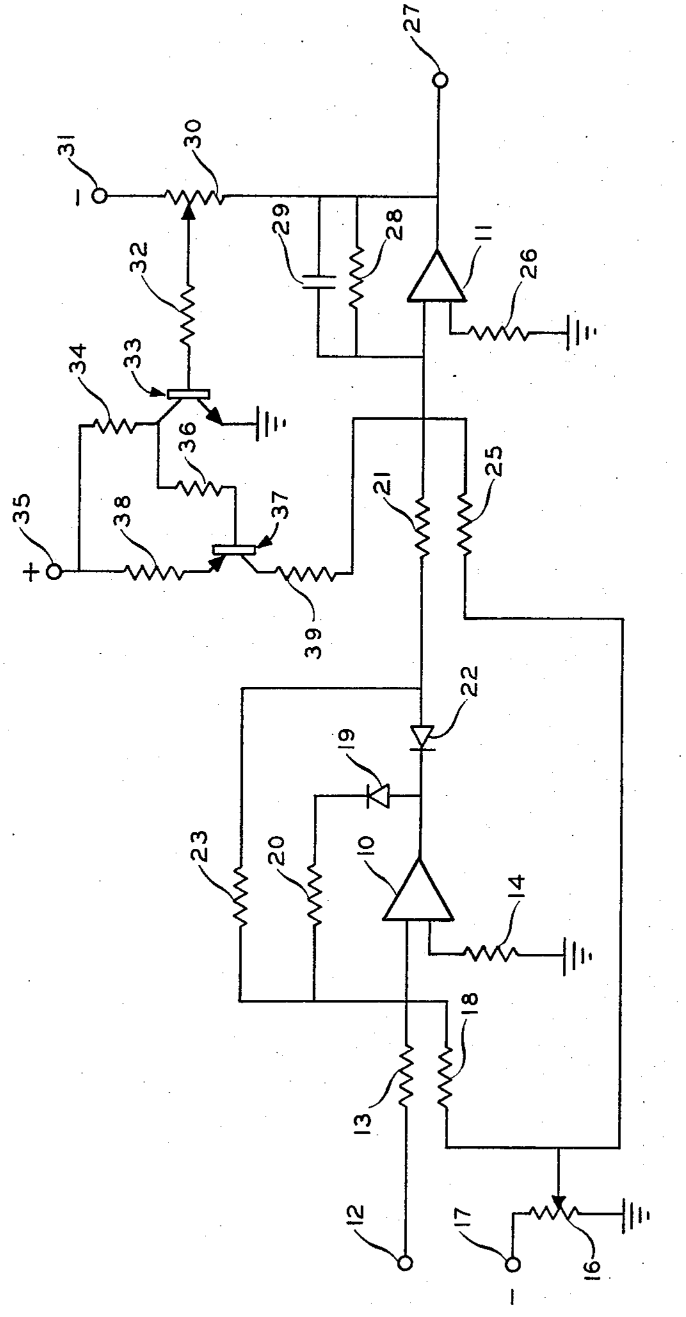
INVENTORS
R. W. MICHAEL
BY HI. W. STATEN, JR.
Young & Quigg
ATTORNEYS

LIMIT CONTROL

In recent years extensive use has been made of automatic control equipment in various industrial operations. Processes are often controlled in response to output signals from analyzers and computers. While this type of control is effective to increase productivity and provide higher quality products, a danger often exists that a malfunction of the control equipment can result in serious operating difficulties. Also, in some operations it is necessary to establish control limits which must not be exceeded regardless of the output signal from the control equipment.

In accordance with this invention, apparatus is provided which effectively limits the amplitude of a control signal. In one embodiment, this is accomplished by means of two operational amplifiers having feedback networks associated therewith. The input signal to be controlled is applied to the input of the first amplifier. A first reference signal representative of a desired lower limit is applied to the inputs of both of the amplifiers. A second reference signal representative of the upper limit controls the feedback network of the second amplifier. The output signal from the second amplifier is representative of The amplitude of the input signal as long as this signal is above the lower and below the upper limit. However, the output signal never falls below the lower limit nor rises above the upper limit.

The accompanying drawing is a schematic circuit illustration of an embodiment of the limit controller of this invention.

Referring now to the drawing in detail, there are shown two operational amplifiers 10 and 11. An input terminal 12, which receives the signal to be regulated, is connected by an input resistor 13 to the first input terminal of amplifier 10. The second input terminal of amplifier 10 is connected to ground by a resistor 14. The end terminals of a potentiometer 16 are connected to a negative potential terminal 17 and to ground, respectively. The contactor of potentiometer 16 is connected by an input resistor 18 to the first input terminal of amplifier 10. A rectifier 19 and a resistor 20 are connected in series relationship between the output and the first input of amplifier 10.

A resistor 21 and a rectifier 22 are connected in series relationship between the first input terminal of amplifier 11 and the output of amplifier 10. A resistor 23 is connected between the first input terminal of amplifier 10 and the junction between resistor 21 and rectifier 22. The contactor of potentiometer 16 is connected by an input resistor 25 to the first input terminal of amplifier 11, the second input terminal of amplifier 11 being connected to ground by a resistor 26. The output of amplifier 11 is connected to an output terminal 27.

A feedback resistor 28 is connected between the output and the first input terminal of amplifier 11. A capacitor 29 is connected in parallel with resistor 28. The end terminals of a potentiometer 30 are connected to the output of amplifier 11 and to a negative potential terminal 31, respectively. A resistor 32 is connected between the contactor of potentiometer 30 and the base of a transistor 33. The emitter of transistor 33 is connected to ground, and the collector of transistor 33 is connected by a resistor 34 to a positive potential terminal 35. A resistor 36 is connected between the collector of transistor 33 and the base of a transistor 37. The emitter of transistor 37 is connected by a resistor 38 to terminal 35, and the collector of transistor 37 is connected by a resistor 39 to the first input of amplifier 11.

Potentiometer 16 is employed to set the lower limit of the amplitude of the output signal which appears at terminal 27. A negative potential, representative of the absolute value of this limit, is thus applied to the input of operational amplifier 10 and to the input of operational amplifier 11. The output of amplifier 10, which operates as a summing amplifier, is proportional to the sum of the current flows through the two input resistors 13 and 18. The amplifier has unity gain in response to either of the inputs. When a positive input signal appears at terminal 12 which is equal in absolute value to the negative potential appearing at the contactor of potentiometer 16, the output of amplifier 10 is zero. The negative potential at the contactor of potentiometer 16 is inverted by unity gain amplifier 11 and appears as a positive potential at output terminal 27. At this time, there is no current flow through resistor 28 to influence the output of amplifier 11 so that the signal at terminal 27 is representative of the lower limit.

If the potential appearing at input terminal 12 should have a lesser positive amplitude than the comparable negative potential at the contactor of potentiometer 16, the net input current to amplifier 10 will be negative to produce a positive output signal. Rectifier 19 and resistor 20 form a feedback circuit at this time, while rectifier 22 blocks current flow to amplifier 11. Thus, the output of amplifier 11 remains proportional solely to the potential at the contactor of potentiometer 16. This prevents the output signal from falling below the lower limit.

If a positive signal appears at terminal 12 which is above the lower limit, amplifier 10 receives a net positive input signal which establishes a negative output signal. At this time, resistor 23 and rectifier 22 constitute the feedback path for amplifier 10. Rectifier 22 conducts so that a negative signal is applied to the input of amplifier 11 through resistor 21. The sum of the two negative input signals results in a positive output signal which is proportional to the input signal at terminal 12.

The upper limit is established by the circuit elements associated with amplifier 11 which form a gate network to control flow of current to the input summing junction of amplifier 11. The contactor of potentiometer 30 normally is maintained at a negative potential or at a slightly positive potential because of the negative reference potential applied at terminal 31. When the output of amplifier 11 exceeds the upper limit, the potential at the contactor of potentiometer 30 becomes sufficiently positive to bias transistor 33 into a state of conduction by current passing through resistor 32 to the base of the transistor. This conduction causes transistor 37 to conduct, which results in current flowing from terminal 35 through resistor 38 and thence to the input summing junction of amplifier 11. This positive current flow acts as an increase in feedback current which serves to limit the output of amplifier 11 to the preselected upper limit.

The lower and upper limits can be adjusted by moving the contactors of respective potentiometers 16 and 30. If only the lower limit is needed in a given application, the transistor feedback circuit associated with amplifier 11 can be eliminated. By reversing polarities and circuit elements, negative signals can be limited in accordance with this invention.

In one specific embodiment of this invention, the following circuit components were employed:

| Element | Value | Element | Value |
|---|---|---|---|
| — | 10,000 ohms | 36 | 1,000 ohms |
| 14 | 3,900 ohms | 38 | 300 ohms |
| 16 | 20,000 ohms | 39 | 1,000 ohms |
| 18 | 10,000 ohms | 29 | .01 microfarad |
| 20 | 10,000 ohms | 19 | IN914 |
| 21 | 10,000 ohms | 22 | IN914 |
| 23 | 10,000 ohms | 33 | 2N1304 |
| 25 | 10,000 ohms | 37 | 2N3906 |
| 26 | 3,900 ohms | 17 | −10 volts |
| 28 | 10,000 ohms | 31 | −10 volts |
| 30 | 20,000 ohms | 35 | +15 volts |
| 32 | 1,000 ohms | 10 | Fairchild 741C |
| 34 | 1,000 ohms | 11 | Fairchild 741C |

While this invention has been described in conjunction with a presently preferred embodiment, it obviously is not limited thereto.

What is claimed is:

1. Apparatus to establish an output signal which is representative of an input signal when the input signal is above a first limit and below a second limit, comprising:

first and second summing amplifiers, each having first and second inputs and an output, the first input of said first amplifier being adapted to receive the input signal;

means connecting the second inputs of said amplifiers to sources of reference potentials;

second and third sources of potential representative of said first and second limits, respectively;

means connecting said second source of potential to the first inputs of said first and second amplifiers;

first unidirectional current conducting means connected between the output and the first input of said first amplifier;

second unidirectional current conducting means connected between the first input of said second amplifier and the output of said first amplifier; and means responsive to said third source of potential and the output of said second amplifier to apply a signal to the first input of said second amplifier to prevent the output signal from said second amplifier from exceeding said second limit.

2. The apparatus of claim 1 wherein said first current conducting means comprises a rectifier and a feedback resistor connected in series relationship.

3. Apparatus to establish an output signal which is representative of an input signal when the input signal is above a preselected limit, comprising:

first and second summing amplifiers, each having first and second inputs and an output, the first input of said first amplifier being adapted to receive the input signal;

means connecting the second inputs of said amplifiers to sources of reference potentials;

a source of second potential representative of said limit;

means connecting said source of second potential to the first inputs of said first and second amplifiers;

first unidirectional current conducting means connected between the output and the first input of said first amplifier; and second unidirectional current conducting means connected between the first input of said second amplifier and the output of said first amplifier.

4. The apparatus of claim 3 wherein said first current conducting means comprises a rectifier and a feedback resistor connected in series relationship.

5. The apparatus of claim 3 wherein said second current conducting means comprises an input resistor and a rectifier connected in series relationship, and further comprising a feedback resistor connected between the junction between said input resistor and said rectifier and the first input of said first amplifier.

6. Apparatus to establish an output signal which is representative of an input signal when the input signal is above a first limit and below a second limit, comprising:

first and second summing amplifiers, each having an input and an output, the input of said first amplifier being adapted to receive the input signal;

first and second sources of reference potential representative of said first and second limits, respectively;

means connecting said first source to the inputs of said first and second amplifiers;

first unidirectional current conducting means connected between the output and the input of said first amplifier;

an input resistor and a rectifier connected in series relationship between the input of said second amplifier and the output of said first amplifier;

a feedback resistor connected between the junction between said input resistor and said rectifier and the input of said first amplifier; and means responsive to said second source and the output of said second amplifier to apply a signal to the input of said second amplifier to prevent the output signal from said second amplifier from exceeding said second limit.

7. Apparatus to establish an output signal which is representative of an input signal when the input signal is above a first limit and below a second limit, comprising:

first and second summing amplifiers, each having an input and an output, the input of said first amplifier being adapted to receive the input signal;

a first source of reference potential representative of said first limit;

means connecting said first source to the inputs of said first and second amplifiers;

first unidirectional current conducting means connected between the output and the first input of said first amplifier;

second unidirectional current conducting means connected between the input of said second amplifier and the output of said first amplifier;

a voltage source;

a potentiometer having one end terminal connected to said voltage source and the other end terminal connected to the output of said second amplifier, the potential at the contactor of said potentiometer being representative of said second limit;

gate means connected to the input of said second amplifier to apply a current thereto when a predetermined control potential is applied to said gate means; and means connecting the contactor of said potentiometer to said gate means to apply a control potentiometer thereto.

8. The apparatus of claim 7 wherein said gate means comprises a second voltage source, a transistor having the emitter-collector circuit path thereof connected between said second voltage source and the input of said second amplifier, and wherein said means to apply a control potential is connected to the base of said transistor.

* * * * *